United States Patent
Katsukawa

(10) Patent No.: US 6,585,170 B2
(45) Date of Patent: Jul. 1, 2003

(54) STRAW WITH A MOUTHPIECE AND A METHOD OF MANUFACTURING THE SAME

(75) Inventor: Yoshitaka Katsukawa, Nara (JP)

(73) Assignee: Mameita Co., Ltd., Nara (JP)

( * ) Notice: Subject to any disclaimer, the term of this patent is extended or adjusted under 35 U.S.C. 154(b) by 0 days.

(21) Appl. No.: 09/819,634

(22) Filed: Mar. 29, 2001

(65) Prior Publication Data

US 2001/0028003 A1 Oct. 11, 2001

(30) Foreign Application Priority Data

Mar. 29, 2000 (JP) .................................. 2000-091222

(51) Int. Cl.[7] .......................... A47G 21/18; A61J 15/00
(52) U.S. Cl. ........................ 239/33; 239/24; D7/300.2
(58) Field of Search ..................... 239/33, 24; D7/300.2

(56) References Cited

U.S. PATENT DOCUMENTS 4,736,887 A * 4/1988 Inaba ........................... 239/33

6,371,329 B1 * 4/2002 Wild ........................... 215/388

FOREIGN PATENT DOCUMENTS

WO     WO 94/14400    * 7/1994 .................. 239/33

OTHER PUBLICATIONS

Japanese Utility Model Laid–open Publication No. 59–28376, Feb. 1984.

* cited by examiner

*Primary Examiner*—Robin O. Evans
(74) *Attorney, Agent, or Firm*—Rothwell, Figg, Ernst & Manbeck, P.C.; Stephen B. Parker, Esq.

(57) ABSTRACT

A straw with a mouthpiece includes a straw main body having openings at both ends thereof and a mouthpiece integrally connected with a tip portion of the straw main body. The tip portion of the straw main body is provided with at least one engaging aperture penetrating a peripheral wall constituting the straw main body, and the mouthpiece is provided with at least one engaging protrusion inwardly protruded from an inner peripheral surface thereof. The engaging protrusion is engaged with the engaging aperture, whereby the mouthpiece is integrally connected with the straw main body so as not to be detached therefrom.

23 Claims, 13 Drawing Sheets

STRAW WITH A MOUTHPIECE AND A METHOD OF MANUFACTURING THE SAME

BACKGROUND OF THE INVENTION

1. Field of the Invention

The present invention relates to a straw with a mouthpiece and a method of manufacturing the same, and more particularly, to a straw with a mouthpiece which ensures an easy and safety drinking for a little child and the manufacturing method thereof.

2. Description of Related Art

Conventionally, a straw which is an elongate tube having an outer diameter constant from one end to the other is widely used.

In cases where babies and little children (hereinafter simply referred to as "little children") drink beverages with the aforementioned conventional straw, since the tip portion of the straw is small and constant in diameter, there are such problems that the straw easily slips out of their mouths after holding the straw in their mouths, and therefore little children spill the beverage from their mouths when the straw slips out of their mouths in the middle of drinking the beverage.

Moreover, since the end of the conventional straw is exposed as it is, little children unfamiliar with the handling of a straw may accidentally poke their throats with the end of the straw. Especially, there is a risk of being injured when little children fall down in the middle of walking with the straw in their mouth.

In order to reduce the aforementioned risks, Japanese Utility Model Laid-open Publication No. 59-28376 proposes a straw with a mouthpiece forcibly inserted into an end of a straw main body. As shown in FIG. 15A, the straw 101 is comprised of a straw main body 102 and a mouthpiece 104. The straw main body 102 is provided with a plurality of stepped circular engaging protrusions 103 formed on the inner peripheral surface of one end of the straw main body 102. The mouthpiece 104 is provided with a plurality of stepped circular engaging protrusions 105 to be engaged with the aforementioned engaging protrusions 103 of the straw main body 102. The engaging protrusions 105 of the mouthpiece 104 is formed on the outer peripheral surface of the inserting portion 104a of the mouthpiece 104 to be inserted into one end of the straw main body 102. As shown in FIG. 15B, the mouthpiece 104 is forcibly fitted into the straw main body 102, whereby the mouthpiece 104 is connected with the straw main body 102 with the engaging protrusions 105 formed on the outer peripheral surface of the inserting portion 104a of the mouthpiece 104 engaged with the engaging protrusions 103 formed on the inner peripheral surface of the straw main body 102.

However, according to the aforementioned straw 101, there is a possibility that the mouthpiece 104 is unintentionally detached from the straw main body 102 when the straw is in use. Since the mouthpiece 104 is forcibly fitted into the straw main body 102 to be connected thereto, if unexpected tensile stress or the like is imparted by being bitten by little children, unexpected pulling force may be imparted to the mouthpiece 104 or the cross-sectional shape of the straw main body 102 may be deformed. This may cause a detachment of the mouthpiece 104 from the straw main body 102. As a result, there is a possibility that little children may accidentally swallow the detached mouthpiece 104 because of the small size.

Moreover, since both the straw main body 102 and the mouthpiece 104 are manufactured separately and then combined with each other, the manufacture process of the straw main body 102, the manufacture process of the mouthpiece 104 and the combination process thereof are required. Thus, manufacturing the aforementioned straw with a mouthpiece requires several processes, which results in inferior productivity.

SUMMARY OF THE INVENTION

An object of the present invention is to provide a straw with a mouthpiece which enables little children to drink a beverage easily and safely.

Another object of the present invention is to provide a straw with a mouthpiece in which the mouthpiece will not be detached from a straw main body unintentionally.

Still another object of the present invention is to provide a straw with a mouthpiece which can prevent an accidental swallow of the mouthpiece even if the mouthpiece is detached from the straw main body.

Still yet another object of the present invention is to provide a method of manufacturing a straw with a mouthpiece with excellent productivity.

According to a first aspect of the present invention, a straw with a mouthpiece includes a straw main body having openings at both ends thereof and a mouthpiece integrally connected with a tip portion of the straw main body. The tip portion of the straw main body is provided with at least one engaging aperture penetrating a peripheral wall constituting the straw main body, and the mouthpiece is provided with at least one engaging protrusion inwardly protruded from an inner peripheral surface thereof. The engaging protrusion is engaged with the engaging aperture, whereby the mouthpiece is integrally connected with the straw main body so as not to be detached therefrom.

With this straw, since the mouthpiece is integrally connected with the tip portion of the straw main body, the straw will not be unintentionally detached from the user's mouth even in cases where little children hold the straw in their mouth, resulting in an easy-to-use straw. Furthermore, the engaging protrusion of the mouthpiece is engaged with the engaging aperture penetrated in the peripheral wall constituting the straw main body, the mouthpiece will not be unintentionally detached from the straw main body. Thus, there is no possibility that little children accidentally swallow the detached mouthpiece when in use, resulting in a safety straw.

It is preferable that the mouthpiece has a passage having an internal diameter smaller than an internal diameter of the straw main body. In this case, it is possible to prevent little children from sucking up an excessive beverage in a single suck to be choked with the beverage. Thus, an easy-to-drink straw can be provided.

It is also preferable that the mouthpiece is integrally formed on the tip portion of the straw main body by an insert molding method. In this case, the connecting strength between the mouthpiece and the straw main body is excellent, which can assuredly prevent the detachment of the mouthpiece from the straw main body.

According to another aspect of the present invention, a straw with a mouthpiece includes a straw main body having openings at both ends thereof, a mouthpiece integrally connected with a tip portion of the straw main body, and a cylindrical reinforcing member downwardly extending from a lower end of the mouthpiece so as to cover and reinforce a predetermined length of the tip portion of the straw main body. The cylindrical reinforcing member is integrally connected with the mouthpiece.

With this straw, since a predetermined length of the tip portion of the straw main body is reinforced by the cylindrical reinforcing member, the predetermined length of the tip portion is prevented from being deformed due to bites, which in turn can prevent a detachment of the mouthpiece from the straw main body due to the cross-sectional deformation of the straw main body at the lower end side of the mouthpiece. Furthermore, since the mouthpiece is integrally connected with the cylindrical reinforcing member, even if the mouthpiece is detached from the straw main body, the mouthpiece will be detached from the straw main body together with the cylindrical reinforcing member. However, since the cylindrical reinforcing member is a relatively long member having a predetermined length, an unintentional swallow of the mouthpiece by little children can be prevented.

It is preferable that the cylindrical reinforcing member is fixed to an outer peripheral surface of the tip portion of the straw main body so as to cover the outer peripheral surface from outside thereof and that the mouthpiece is fixed to the tip portion of the straw main body such that the mouthpiece covers an outer peripheral surface of the tip portion of the cylindrical reinforcing member and the tip portion of the straw main body. With this structure, the materials, the color, etc., can be changed between the mouthpiece and the cylindrical reinforcing member. Thus, it is possible to provide a straw with specific design by changing the color between the mouthpiece and the cylindrical reinforcing member.

It is preferable that the tip portion of the straw main body and a tip portion of the cylindrical reinforcing member are provided with at least one engaging aperture, respectively, each of the at least one engaging aperture penetrating a peripheral wall constituting the straw main body and a peripheral wall constituting the cylindrical reinforcing member, respectively, wherein the mouthpiece is provided with at least one engaging protrusion inwardly protruded from an inner peripheral surface thereof, and wherein the at least one engaging protrusion is engaged with each of the at least one engaging aperture, whereby the straw main body, the mouthpiece and the cylindrical reinforcing member are integrally connected with each other so as not to be detached from each other. With this structure, the straw main body, the mouthpiece and the cylindrical reinforcing member are integrally connected with each other easily and assuredly, which can assuredly prevent the detachment thereof.

According to still another aspect of the present invention, a method of manufacturing a straw with a mouthpiece, including the steps of: preparing a straw main body provided with at least one engaging aperture formed on a peripheral wall of a tip portion of the straw main body; inserting a molding pin into the straw main body so that a tip portion of the molding pin outwardly protrudes from the tip portion of the straw main body; integrally forming the mouthpiece so as to surround the tip portion of the straw main body and the tip portion of the molding pin by an insert molding method; and removing the molding pin.

With this method, since the engaging aperture is provided in the peripheral wall of the tip portion of the straw main body, the mouthpiece can be integrally formed on the tip portion of the straw main body with the resin engaging protrusion engaged with the engaging aperture. Furthermore, since the method includes the step of integrally forming the mouthpiece so as to surround the tip portion of the straw main body and the tip portion of the molding pin by an insert molding method and the step of removing the molding pin from the mouthpiece and the straw main body, a hollow space penetrating the mouthpiece in the axial direction of the straw can be formed, and the hollow space comes in fluid communication with the inner space of the straw main body to form a passage for sucking up a beverage. Moreover, according to the aforementioned method, the step for manufacturing the mouthpiece and the step for connecting the mouthpiece with the straw main body can be performed simultaneously at the time of the insert molding of the mouthpiece. This decreases the steps of manufacturing a straw with a mouthpiece and enhances the productivity.

It is preferable that the molding pin has the tip portion having an external diameter smaller than an external diameter of the remaining portion thereof. In this case, it is possible to provide a straw with a mouthpiece which prevents little children from sucking up an excessive beverage in a single suck to be choked with the beverage. Thus, an easy-to-drink straw can be provided.

According to still yet another aspect of the present invention, a method of manufacturing a straw with a mouthpiece, including the steps of:

inserting a molding pin into a straw main body so that a tip portion of the molding pin outwardly protrudes from a tip portion of the straw main body;

integrally forming a cylindrical reinforcing member for reinforcing a predetermined length of the tip portion of the straw main body on an outer peripheral surface of the tip portion of the straw main body in a closely fitted manner;

forming one or a plurality of engaging apertures in a peripheral wall of the cylindrical reinforcing member and that of the straw main body;

integrally forming the mouthpiece having an enlarged head portion so as to surround an external peripheral surface of the tip portion of the cylindrical reinforcing member and an external peripheral surface of an upwardly protruded portion of the forming pin by an insert molding method; and removing the molding pin.

With this method, since the cylindrical reinforcing member for reinforcing the predetermined length of the tip portion of the straw main body is integrally formed on the outer peripheral portion of the straw main body in a closely fitted manner, the manufacture of the cylindrical reinforcing member and the attachment of the cylindrical reinforcing member to the straw main body can be preformed simultaneously. This enhances the productivity of a straw with a mouthpiece. Furthermore, since one or a plurality of engaging apertures are formed in a peripheral wall of the cylindrical reinforcing member and that of the straw main body, and the mouthpiece having an enlarged head portion is integrally formed so as to surround an external peripheral surface of the tip portion of the cylindrical reinforcing member and an external peripheral surface of an upwardly protruded portion of the forming pin by an insert molding method, the manufacture of the cylindrical reinforcing member and the attachment of the cylindrical reinforcing member to the straw main body can be preformed simultaneously. This enhances the productivity of a straw with a mouthpiece. In addition, since resin flows not only onto the peripheral wall of the cylindrical reinforcing member but also the peripheral wall of the straw main body, an integration of the members can be performed assuredly and easily. Moreover, when the forming pin is removed after the integration molding, a hollow space penetrating the mouthpiece in the axial direction is formed. Since this hollow space communicates with the hollow space of the straw main body, a sucking aperture having a predetermined diameter can be formed in the mouthpiece without performing special aperture forming steps.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Figures 1A, 1B:
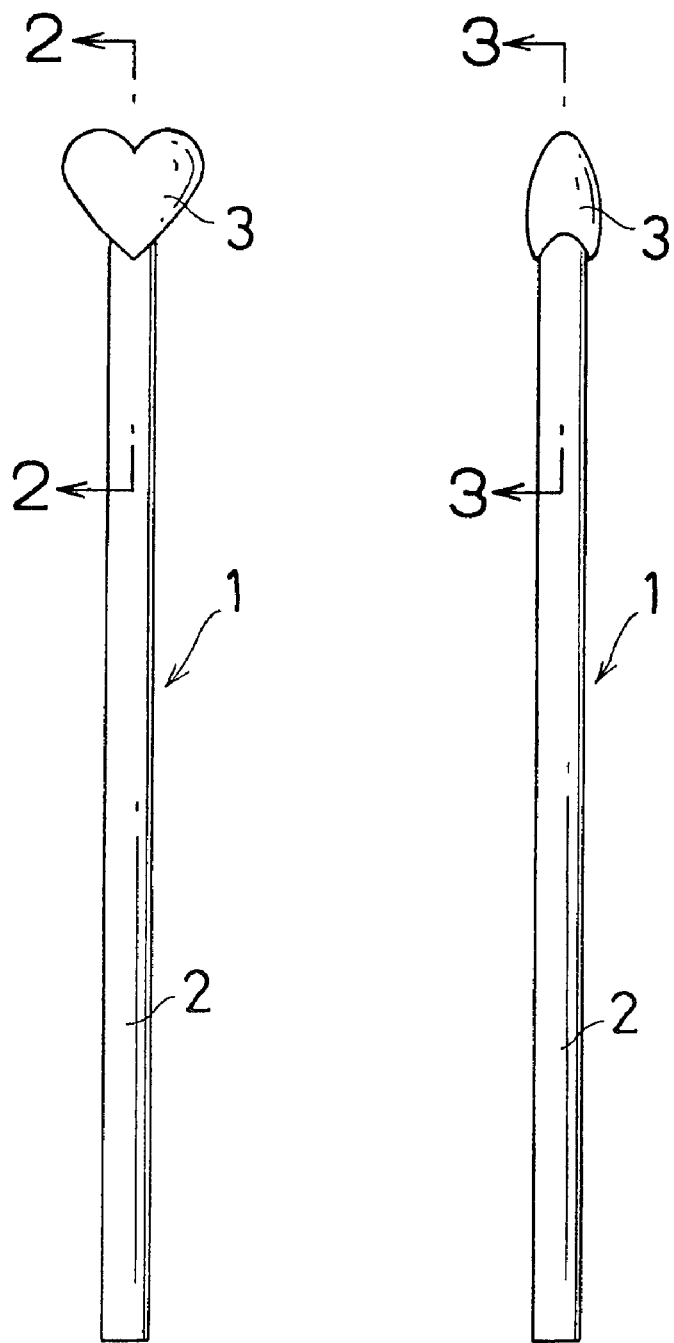
FIG. 1A is a front view showing a straw with a mouthpiece according to a first embodiment of the present invention.
FIG. 1B is a side view showing the straw with the mouthpiece shown in FIG. 1A.

A straw with a mouthpiece according to a first embodiment of the present invention is shown in FIGS. 1A and 1B.

The straw with a mouthpiece 1 includes a straw main body 2 which is an elongate synthetic resin tube having openings at both ends thereof and a mouthpiece 3 made of colored synthetic resin which is formed into a heart-shape as seen from the front. The mouthpiece 3 is integrally formed on the tip portion of the straw main body 2 by an insert forming method.

Figure 2:
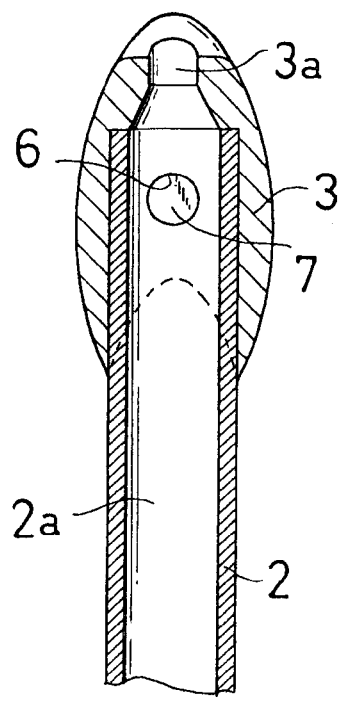
FIG. 2 is an enlarged cross-sectional view taken along the line 2—2 shown in FIG. 1A.
Figure 3:
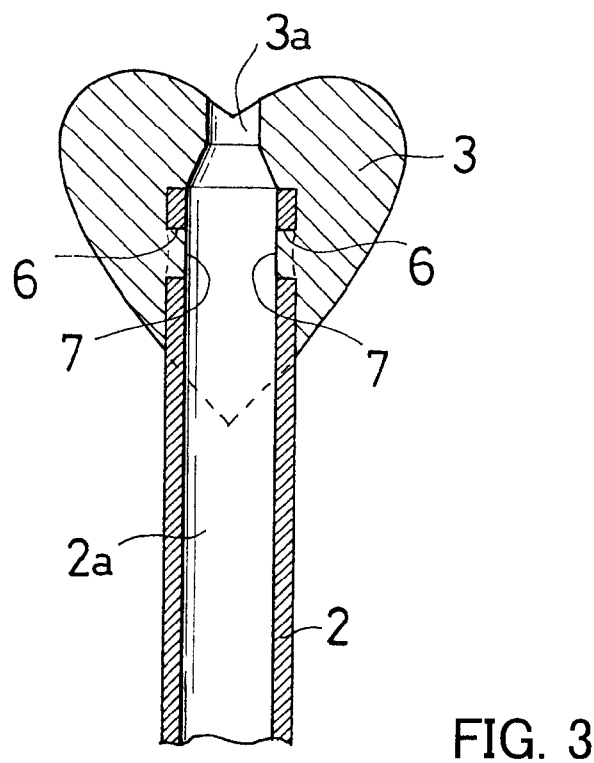
FIG. 3 is an enlarged cross-sectional view taken along the line 3—3 shown in FIG. 1B.

As shown in FIGS. 2 and 3, the mouthpiece 3 is provided with a hollow space 3a penetrated and extended in the axial direction of the straw main body 2. This hollow space 3a is in fluid communication with an inner hollow space 2a of the straw main body 2 so as to form a passage for sucking up a beverage. Since the mouthpiece 3 having an external diameter larger than an external diameter of the straw main body 2 is integrally connected with the tip portion of the straw main body 2, the straw will not be unintentionally detached from a mouth when little children hold the mouthpiece 3 in their mouths, which make them easy to drink a beverage. Furthermore, in this embodiment, since the internal diameter of hollow space 3a of the mouthpiece 3 is smaller than the internal diameter of the inner hollow space 2a of the straw main body 2, it is possible to prevent little children from sucking up an excessive beverage in a single suck to be choked with the beverage. Thus, an easy-and-safe-to-drink straw 1 can be provided.

The straw main body 2 is provided with opposing two engaging apertures 6 at the peripheral wall of the tip portion thereof. On the other hand, the mouthpiece 3 is provided with opposing two inwardly protruded engaging protrusions 7 at the inner peripheral surface thereof. The engaging protrusions 7 are engaged with the corresponding engaging apertures 6 as best shown in FIG. 3. As will be apparent from the above, since the mouthpiece 3 and the straw main body 2 are engaged with each other so as not to be detached in an axial direction thereof, the mouthpiece 3 will not be easily detached from the straw main body 2. Accordingly, in cases where little children use the straw 1, there is no fear of an accidental swallow of the mouthpiece 3, resulting in a safety straw.

Moreover, the straw 1 having the mouthpiece 3 integrally connected with the tip portion of the straw main body 2 has a unique appearance quite different from a conventional straw, which can provide a new design of straw. In other words, the present invention can provide a safe and functional straw with an excellent design. According to the aforementioned first embodiment, the mouthpiece 3 can be colored in yellow, pink or any other color, which can provide much more enhanced design of a straw.

As the synthetic resin constituting the straw main body 2, although it is not specifically limited, for example, EVA (ethylene acetic acid vinyl copolymer resin), polypropylene, polyethylene can be used. Moreover, as the synthetic resin constituting the mouthpiece 3, although it is also not specifically limited, for example, acetic acid vinyl resin, EVA (ethylene acetic acid vinyl copolymer resin), polypropylene or polyethylene can be used.

Figure 4A:
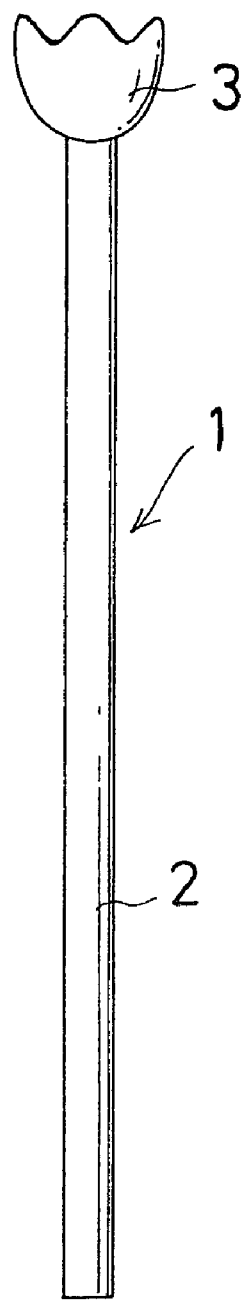
FIG. 4A is a front view showing a straw with a mouthpiece according to a second embodiment of the present invention.
Figure 4B:
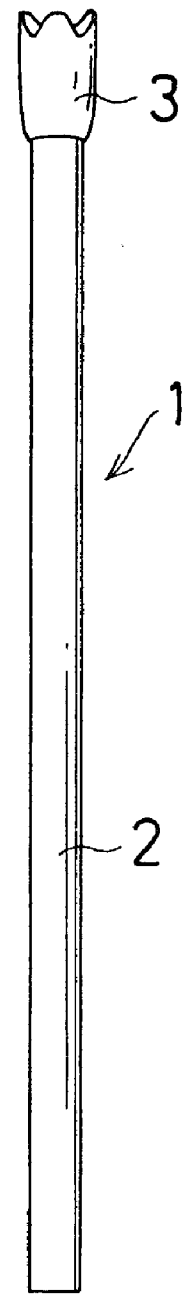
FIG. 4B is a side view showing the straw with the mouthpiece shown in FIG. 4A.

In the aforementioned first embodiment, the mouthpiece 3 is formed into a heart shape as seen from the front. However, the shape of the mouthpiece 3 is not specifically limited to such a shape. As shown in FIGS. 4A and 4B, the shape may be a tulip shape or a circular shape as seen from the front. However, the shape is not specifically limited.

In the aforementioned first embodiment, although the straw main body 2 is formed to have a straight elongated cylindrical shape. However, the shape thereof is not limited to such a shape. The straw main body 2 may have a curved or looped portion at the longitudinal middle portion or a portion having a bellows-like mechanism which can be bended and/or expanded.

Furthermore, in the aforementioned first embodiment, although the number of engaging apertures 6 and that of engaging protrusions 7 are set to two, respectively, the number thereof is not limited but may be one, three or more, respectively. However, in order to assuredly prevent the mouthpiece 3 from being detached from the straw main body 2, it is desirable that the number of engaging apertures 6 and that of engaging protrusions 7 are set to at least two, respectively.

The straw with a mouthpiece 1 according to the first embodiment can be manufactured as follows, for example.

First, a straw main body 2 provided with engaging apertures 6 formed in the peripheral wall of the tip portion thereof is prepared.

Figure 9:
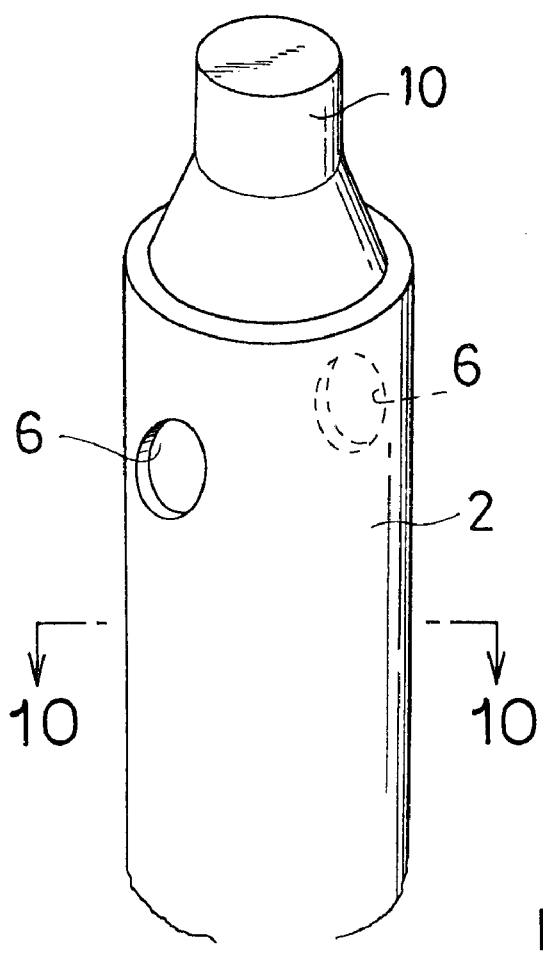
FIG. 9 is a perspective view showing the straw main body of the straw according to the first embodiment in which a molding pin is disposed in the straw main body.

Then, as shown in FIG. 9, a molding pin 10 is disposed in the inner hollow space 2a of the straw main body 2 such that an upper end of the molding pin 10 is outwardly protruded from the upper end of the straw main body 2. In detail, the straw main body 2 is set onto the molding pin 10 which is uprightly extended from the lower portion of the forming die of the forming machine such that the upper end of the molding pin 10 is outwardly protruded from the upper end of the straw main body 2.

Figure 10:
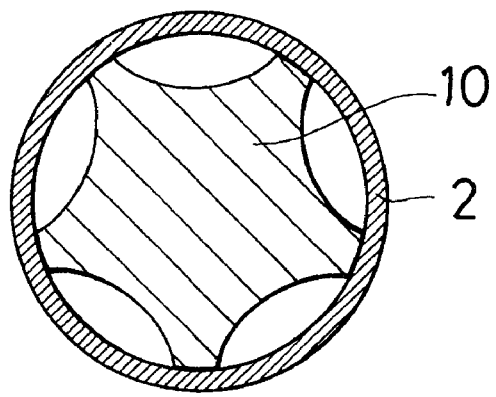
FIG. 10 is a cross-sectional view taken along the line 10—10 in FIG. 9.

As shown in FIG. 10, except for the upper end portion, the aforementioned molding pin 10 has a horizontal cross-section having several inwardly dented outer peripheral surfaces. This decreases the contact area between the outer peripheral surface of the molding pin 10 and the inner peripheral surface of the straw main body 2, which enables a smooth setting of the molding pin into the straw main body 2. The upper end portion 12 of the molding pin 10 is formed to have a true circular shape in cross-section. The external diameter of the tip portion 12 is set to be smaller than the external diameter of the longitudinal middle portion thereof.

Figure 11A:
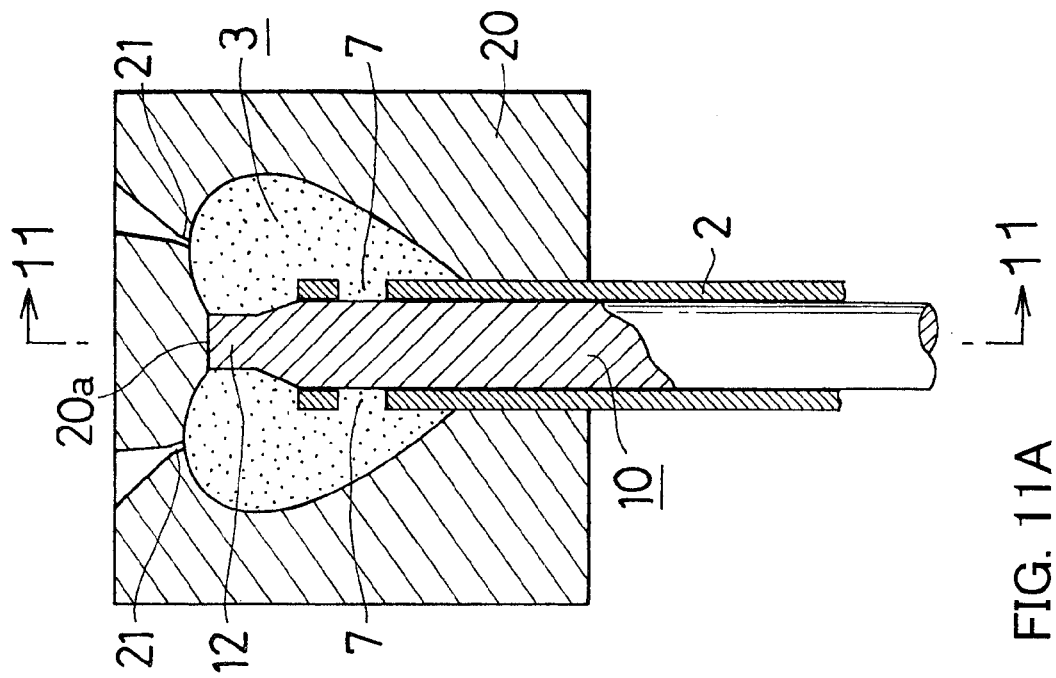
FIG. 11A is a cross-sectional view showing the forming die for forming the straw with the mouthpiece according to the first embodiment at the time of the insertion forming.
Figure 11B:
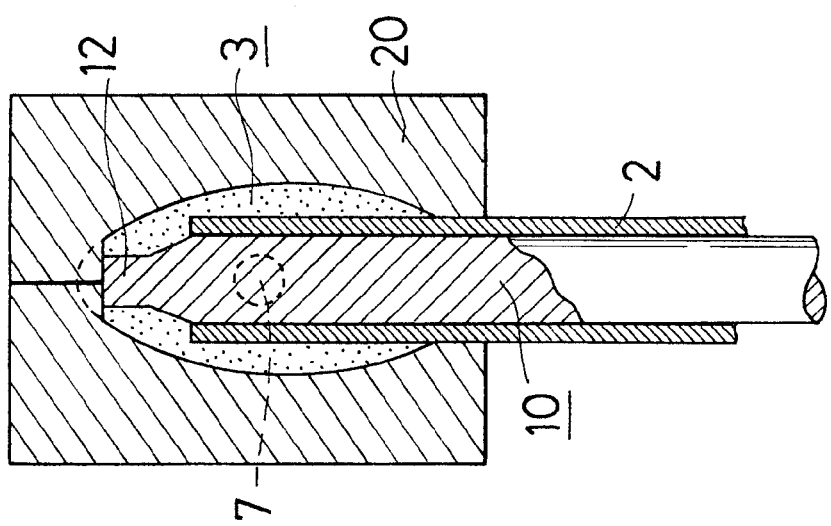
FIG. 11B is a cross-sectional view taken along the line 11—11 in FIG. 11A.

Next, around the tip portion of the straw main body 2 and the tip portion of the molding pin 10, a mouthpiece is integrally formed by an insert forming method. The arrangement of the straw main body 2 and the molding pin 10 in a forming die 20 at the time of the insert molding is shown in FIGS. 11A and 11B. The tip portion 12 of the molding pin 10 outwardly protruding from the tip portion of the straw main body 2 is disposed so as to come in contact with the central upper surface of the cavity of the forming die 20. In this state, resin is ejected into the cavity through two pin gates 21 provided in the cavity upper surface. As a result, the resin enters into the engaging apertures 6 of the straw main body 2 to integrally form a mouthpiece 3 with projections 7 disposed in the engaging apertures 6. In other words, the mouthpiece 3 having inwardly protruded engaging protrusions 7 formed on the inner peripheral surface thereof and engaged with the engaging apertures 6 of the straw main body 2, can be integrally formed. In this state, the synthetic resin of the mouthpiece 3 is integrally thermally adhered or welded to the synthetic resin of the straw main body 2, which further enhances the connecting strength therebetween.

Subsequently, the molding pin 10 is pulled down from the forming die 20, which forms a hollow space 3a penetrated in the axial direction of the straw in the mouthpiece 3. Since the hollow space 3a becomes in fluid communication with the hollow space 2a of the straw main body 2, a passage for sucking up a beverage is formed. Since the external diameter of the tip portion 12 of the molding pin 10 is smaller than that of the remaining portion thereof, the inner diameter of the passage of the mouthpiece 3 becomes smaller than that of the straw main body 2. Accordingly, there is no fear for little children to suck up an excessive beverage in a single suck to be choked with the beverage. Thus, an easy-to-drink straw can be provided.

According to the aforementioned manufacture method, since manufacturing the mouthpiece 3 and integrally connecting the straw main body 2 with the mouthpiece 3 can be performed simultaneously at the time of insert molding, the number of steps for manufacturing the straw can be decreased, resulting in an enhanced production efficiency.

Figure 12A:
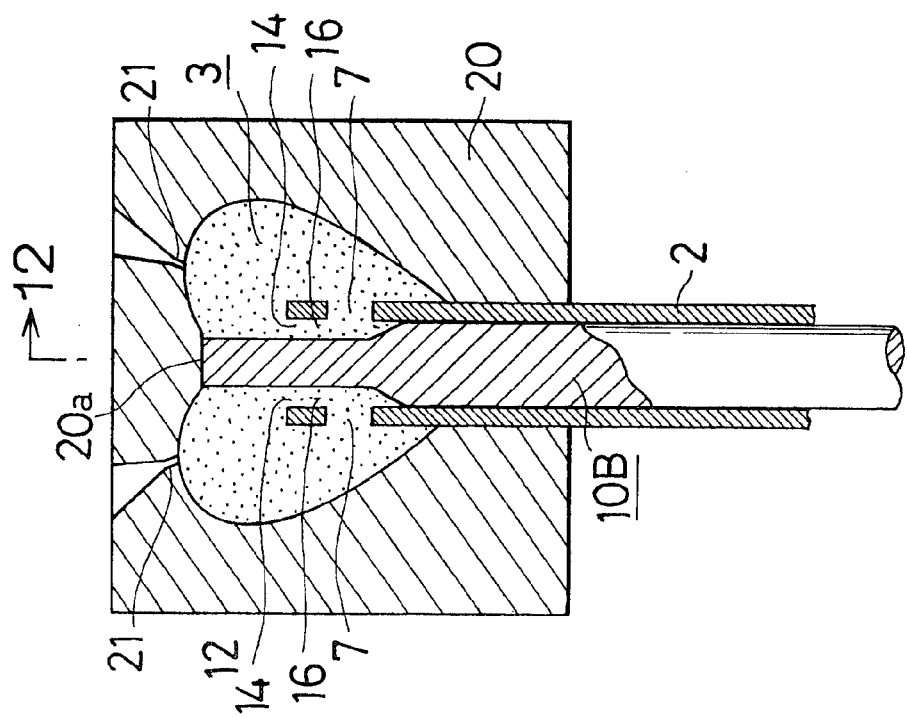
FIG. 12A is a cross-sectional view showing the straw with the mouthpiece according to the fifth embodiment disposed in the forming die immediately after the insert forming.
Figure 12B:
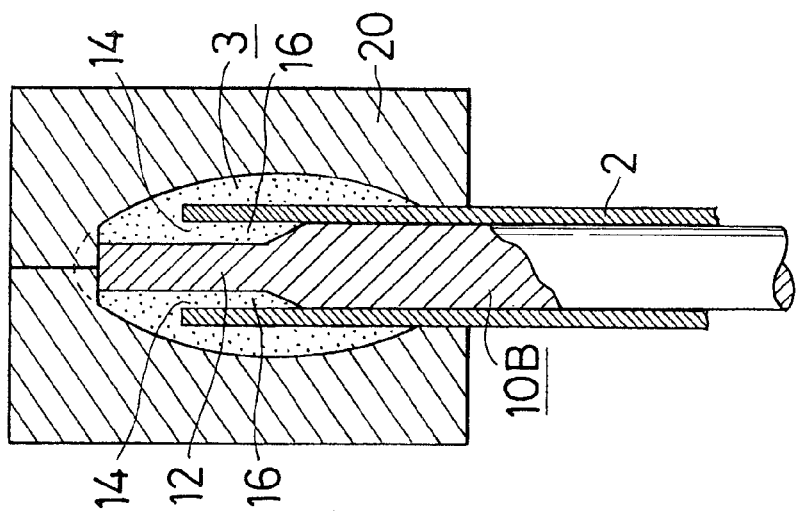
FIG. 12B is a cross-sectional view taken along the line 12—12 in FIG. 12A.

FIGS. 12A and 12B show a fifth embodiment of a straw with a mouthpiece and a forming die 20. In this fifth embodiment, although the structure of the forming die 20 is completely the same as that of the aforementioned die, the structure of this molding pin 10B differs from the aforementioned pin 10.

In detail, the length of the small-diameter tip portion 12 of this molding pin 10B is set to be longer than that of the aforementioned molding pin 10 so as to form a gap 14 between the tip portion of the straw main body 2 and the small-diameter tip portion 12 of the molding pin 10B. As a result, when resin is ejected into the cavity through the pin gates 21, the resin enters into the gap 14 to thereby integrally connect the mouthpiece 3 with the straw main body 2 with a part of the mouthpiece 3 disposed inside the straw main body 2. Furthermore, since the portion 16 entered into the gap 14 is integrally formed with the engaging protrusions 7, the detachment of the mouthpiece 3 from the straw main body 2 can be prevented assuredly. In other words, unless this connection portion 16 is destroyed, the mouthpiece 3 will never be detached from the straw main body 2.

Figures 5A, 5B:
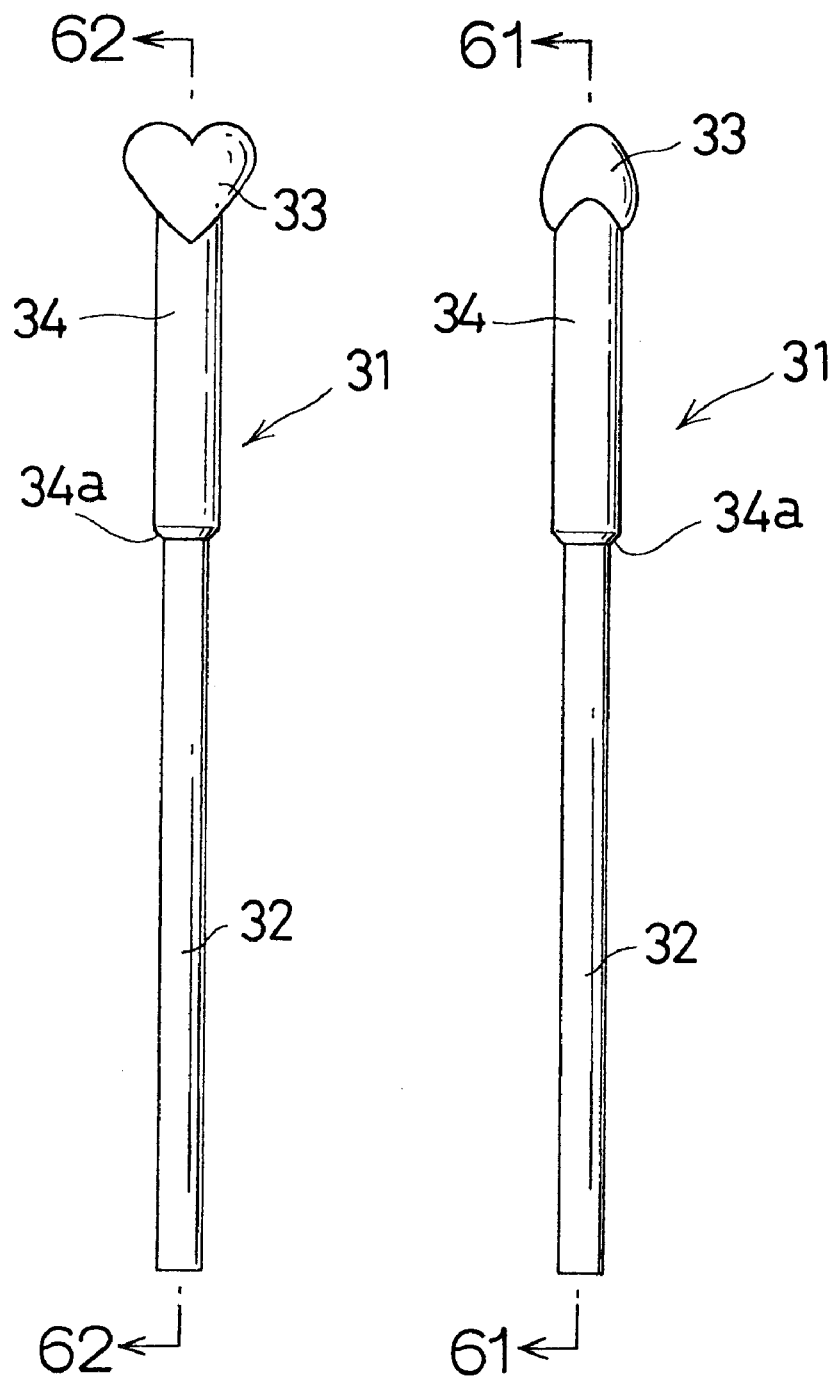
FIG. 5A is a front view showing a straw with a mouthpiece according to a third embodiment of the present invention.
FIG. 5B is a side view showing the straw with the mouthpiece shown in FIG. 5A.
Figure 6A:
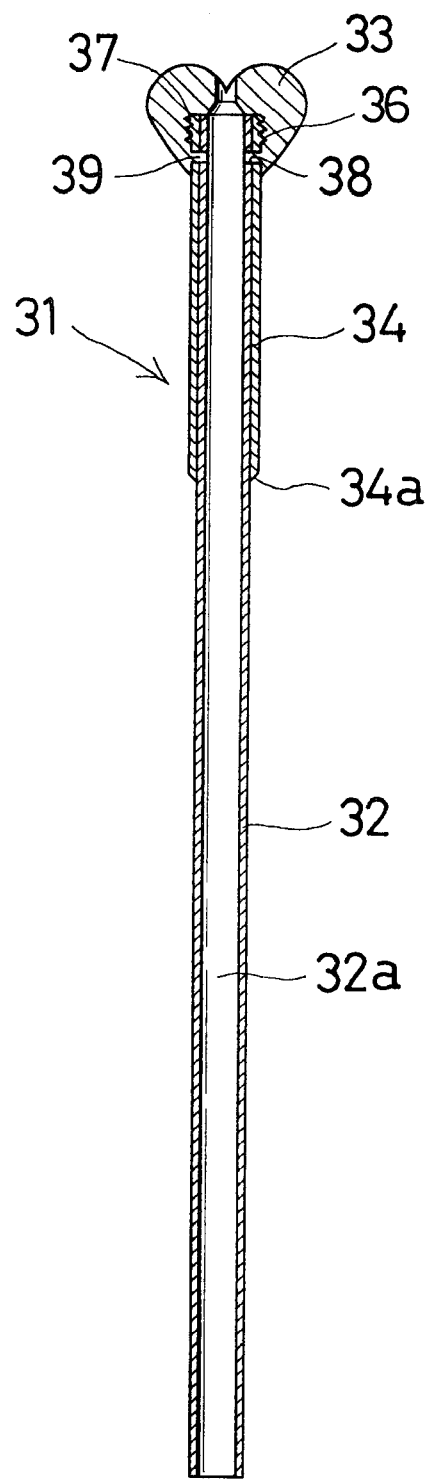
FIG. 6A is a cross-sectional view taken along the line 61—61 in FIG. 5B.
Figure 6B:
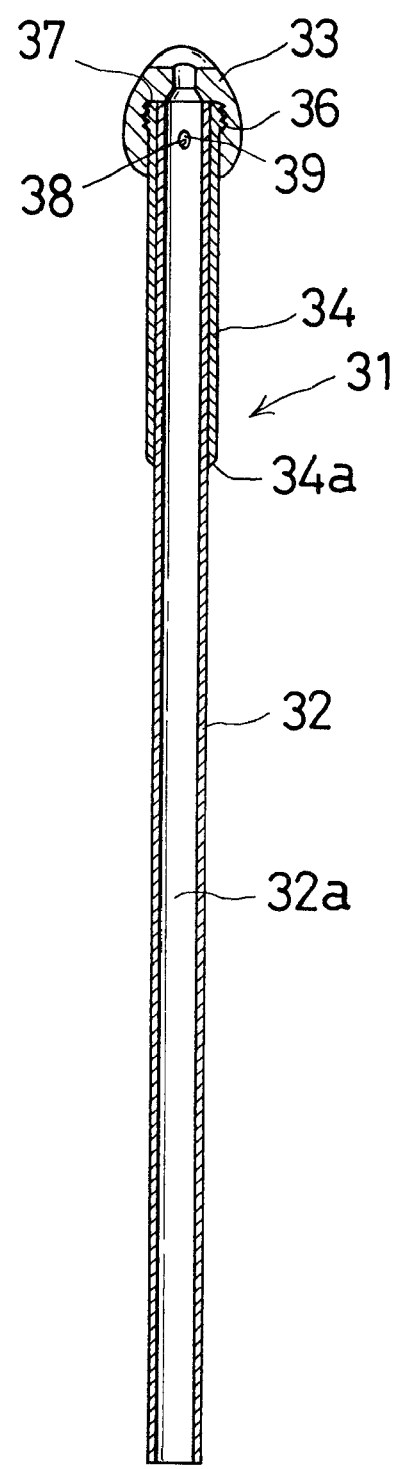
FIG. 6B is a cross-sectional view taken along the line 62—62 in FIG. 5A.
Figure 7A:
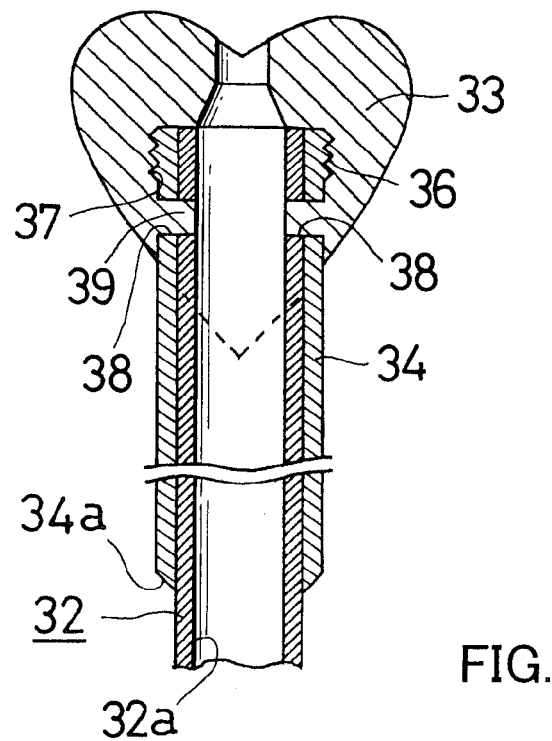
FIG. 7A is an enlarged cross-sectional view of the main portion in FIG. 6A.
Figure 7B:
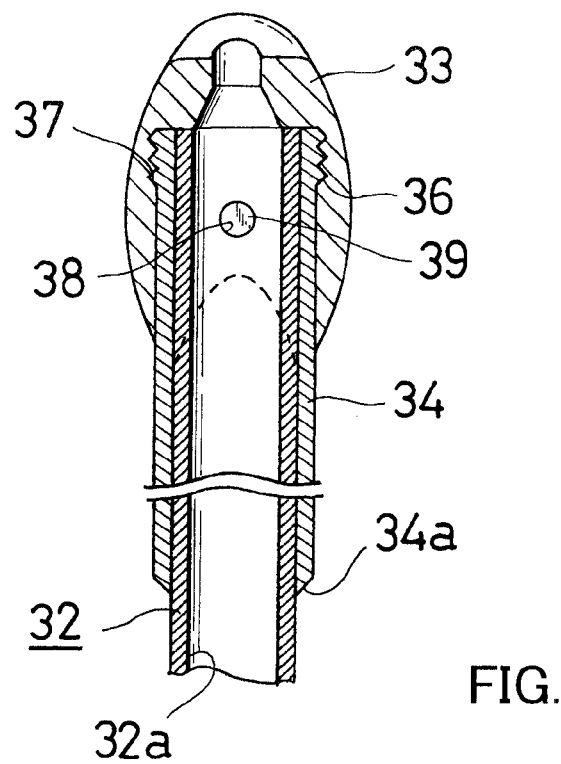
FIG. 7B is an enlarged cross-sectional view of the main portion in FIG. 6B.

FIGS. 5 to 7 show a straw with a mouthpiece 31 according to a third embodiment of the present invention. This embodiment is different from the first embodiment in that a cylindrical reinforcing member 4 extending from the lower end portion of the mouthpiece 33 is integrally provided so as to cover a predetermined length of the tip portion of the straw main body 32 in a closely fitted manner in order to reinforce the tip portion. In detail, a heart-shaped colored synthetic resin mouthpiece 33 with an enlarged head portion is integrally connected to the tip portion of the synthetic resin straw main body 32 made of a narrow pipe having openings at both ends thereof so as to cover the tip portion. Furthermore, a cylindrical reinforcing member 34 downwardly extending from the lower end portion of the mouthpiece 33 is integrally connected to the straw main body 32 so as to cover the predetermined length of the tip portion of the straw main body in a closely fitted manner. In further detail, as best shown in FIGS. 6A to 7B, in this straw with a mouthpiece 31, the aforementioned cylindrical reinforcing member 34 is closely fitted on the outer peripheral surface of the tip portion of the straw main body 32 by an insert molding method, and the mouthpiece 33 is integrally formed on the outer peripheral surface of the tip portion of the cylindrical reinforcing member 34 by an insert molding method.

Since the portion of the straw main body 32 near the lower end of the mouthpiece 33 is covered and reinforced by the cylindrical reinforcing member 34, the peripheral wall of the straw main body 32 located below the mouthpiece 33 is reinforced so as not to be deformed by bites. Accordingly, even if little children bite the straw 31, the mouthpiece 33 is hardly detached from the straw main body 32. If the mouthpiece 33 should be detached from the straw main body 32, the mouthpiece 33 will be detached together with the cylindrical reinforcing member 34. However, since the cylindrical reinforcing member 34 is a relatively large piece covering the predetermined length of the tip portion of the straw main body 32, there is no fear that little children swallow it accidentally, resulting in a safety straw. It is preferable that the length of the cylindrical reinforcing member 34 falls within the range of from 25 mm to 60 mm so as to cover the tip portion of the straw main body 31 from the tip end thereof. If the length of the cylindrical reinforcing member 34 is shorter than 25 mm, it is not preferable because there is the danger that little children may swallow the mouthpiece 33 together with the cylindrical reinforcing member 34 detached from the straw main body 32. On the other hand, if the length of the cylindrical reinforcing member 34 is longer than 60 mm, it is not preferable because not only the manufacturing cost increases but also the design deteriorates. More preferably, the length of the cylindrical reinforcing member 34 falls within the range of from 35 mm to 50 mm.

The cylindrical reinforcing member 34 is formed to have a downwardly inwardly tapered insertion guide 34a at the lower end portion thereof. This enables an easy forcible insertion of the cylindrical reinforcing member 34 into a straw insertion aperture having a relatively small diameter, such as a straw insertion aperture formed in a cup with a cover. As a result, the straw 31 forcibly inserted into the straw aperture is hard to be pulled out, resulting in an easy-to-drink straw 31.

Furthermore, as shown in FIGS. 7A and 7B, the cylindrical reinforcing member 34 is provided with a plurality of circular detach-prevention protrusions 36 at the outer peripheral surface of the tip portion thereof. These protrusions 36 are formed to have a zigzag cross-section along the axial direction of the straw 31. On the other hand, the mouthpiece 33 is provided with a plurality of circular engaging grooves 37 corresponding to the aforementioned detach-prevention protrusions 36 at the inner surface thereof. Thus, the detach-prevention protrusions 36 are engaged with the circular engaging grooves 37, whereby the mouthpiece 33 is integrally connected to the cylindrical reinforcing member 34.

Furthermore, the peripheral wall of the cylindrical reinforcing member 34 and that of the straw main body 32 are provided with opposing two penetrated engaging apertures 38 and 38, respectively. On the other hand, the mouthpiece 38 is provided with two opposing inwardly protruded engaging protrusions 39 and 39 at the inner surface thereof. These engaging protrusions 39 and 39 are engaged with the aforementioned corresponding engaging apertures 38 and 38. As a result, according to this third embodiment, the mouthpiece 33 and the straw main body 32 are engaged with each other in the axial direction thereof likewise the first embodiment. Therefore, the mouthpiece 33 is strongly integrated with the cylindrical reinforcing member 34, whereby the mouthpiece 31 and the reinforcing member 34 are hardly detached from the straw main body 32. In this manner, in cases where little children use this straw, it is possible to more assuredly prevent the risk that little children swallow the mouthpiece 33 accidentally, which enhances the safety.

Furthermore, since the cylindrical reinforcing member 34 and the mouthpiece 33 are integrally connected to the tip portion of the straw main body 32, the straw 31 can have an appearance different from that of a conventional straw, giving a novel and unconventional design. Especially, in this third embodiment, since the mouthpiece 32 is integrally formed on the tip portion of the cylindrical reinforcing member 34 covering the tip portion of the straw main body 32, the material, the color, etc. can be changed between the mouthpiece 33 and the cylindrical reinforcing member 34. For example, if different colors are applied to the mouthpiece 33 and the reinforcing member 34, it is possible to provide more beautiful design.

According to this third embodiment, since the cylindrical reinforcing member 34 is formed by an insert forming method and the mouthpiece 33 is integrally formed on the outer peripheral surface of the tip portion of the reinforcing member 34 having an even outer diameter, a mouthpiece 33 with excellent appearance can be obtained compared to a mouthpiece directly formed on a straw main body 32 having uneven external diameters along the axial length thereof. In other words, it is possible to effectively prevent the generation of bur due to a forming die unfitted on the straw main body 32.

The material of the cylindrical reinforcing member 34 is not limited to a specific one, and may be acetic acid vinyl resin, EVA(ethylene acetic acid vinyl copolymer resin), polypropylene or polyethylene.

Figure 8A:
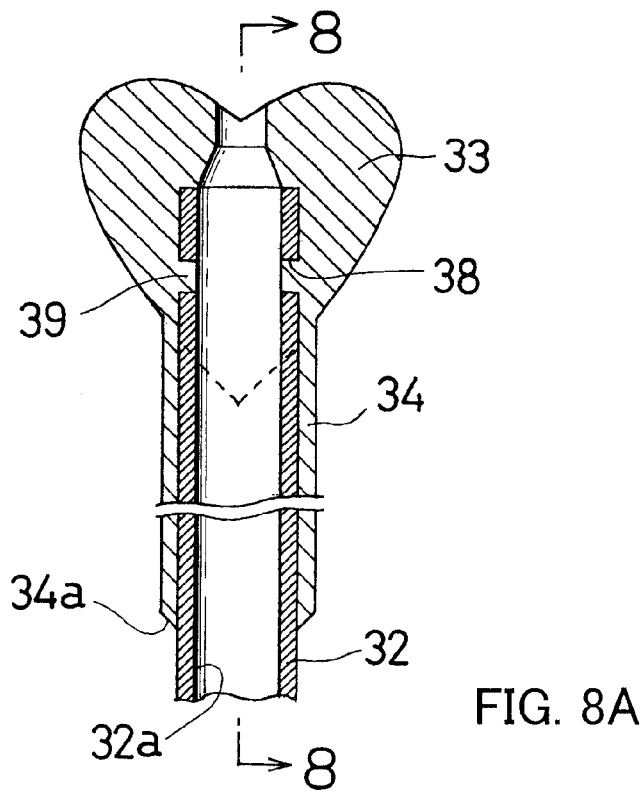
FIG. 8A is an enlarged cross-sectional view of a straw with a mouthpiece according to a fourth embodiment of the present invention.
Figure 8B:
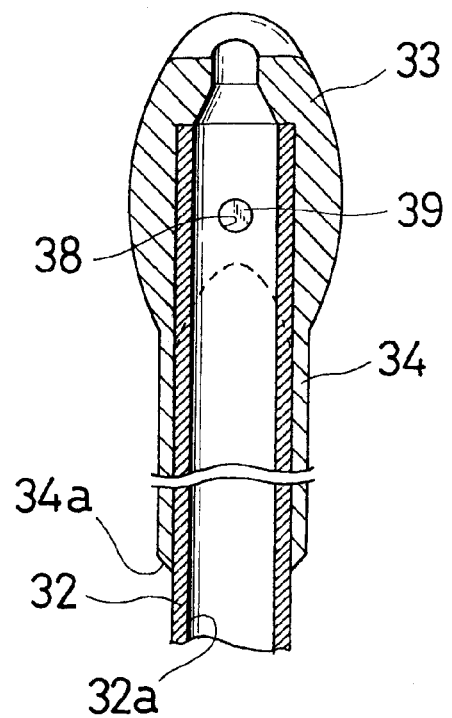
FIG. 8B is a cross-sectional view taken along the line 8—8 in FIG. 8A.

In the aforementioned straw with the mouthpiece according to the third embodiment, the mouthpiece 33 is integrally formed by an insert forming method on the outer peripheral surface of the tip portion of the cylindrical reinforcing member 4 which is formed by an insert forming method. However, as shown in FIGS. 8A and 8B for example, the mouthpiece 33 and the cylindrical reinforcing member 34 may be integrally formed simultaneously by a single insert forming process.

Since the other structure of the third embodiment is the same as that of the first embodiment, the explanation will be omitted.

The straw with the mouthpiece 31 according to the third embodiment will be manufactured as mentioned below, for example.

First, in the same way as in the manufacturing method of the aforementioned straw with the mouthpiece, the forming pin 10 is inserted into the hollow space 32a of the straw main body 32 so that a part of the forming pin 10 is outwardly protruded from the tip portion of the straw main body 32.

Figure 13:
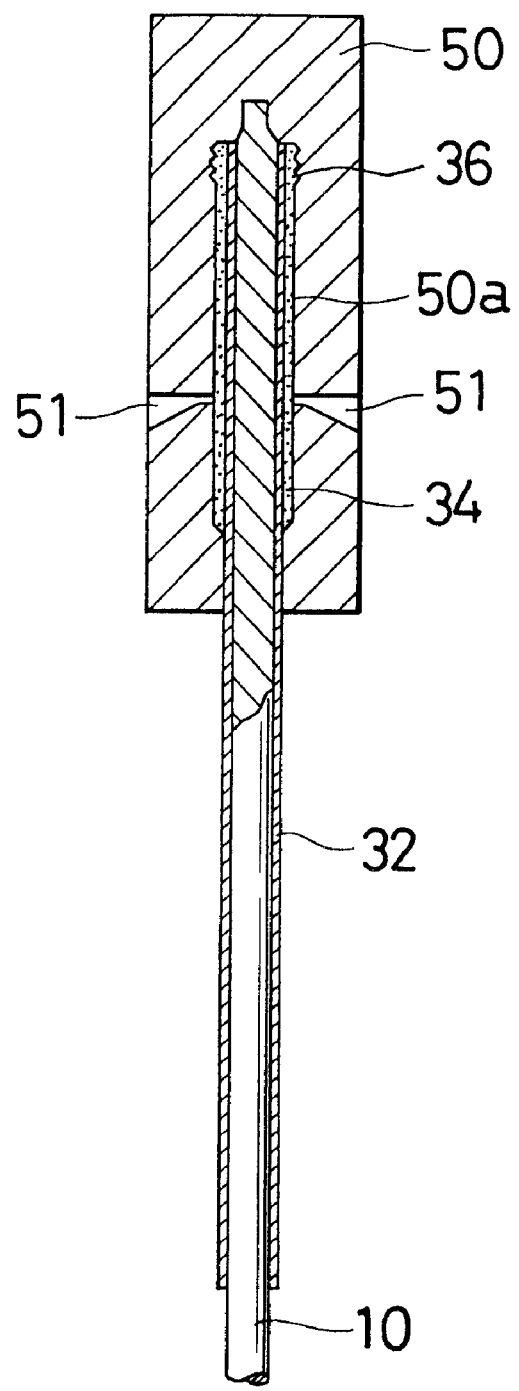
FIG. 13 is a cross-sectional view showing the forming die for forming the cylindrical reinforcing member of the straw with the mouthpiece according to the third embodiment.

Then, in a state that the forming pin 10 is inserted into the straw main body 31, a cylindrical reinforcing member 34 is integrally formed on the outer peripheral surface of the tip portion of the straw main body 32 so as to cover and reinforce the predetermined length of the tip portion of the straw main body 32 by an insert forming method. The arrangement of the straw main body 32 and the forming pin 10 in the forming die 20 at the time of the insertion forming is shown in FIG. 13. In this arrangement status, resin is injected into the cavity 50a through two pin-gates 51 and 51 formed on the side surface of the cavity 50a to integrally form the cylindrical reinforcing member 34. In other words, the forming of the cylindrical reinforcing member 34 and the covering of the reinforcing member 34 onto the straw main body 32 can be simultaneously performed, to thereby decrease the number of process. This enhances the productivity of the straw with the mouthpiece 31. In this state, the resin of the cylindrical reinforcing member 34 is integrally thermally adhered or welded to the resin of the straw main body 32.

Figure 14A:
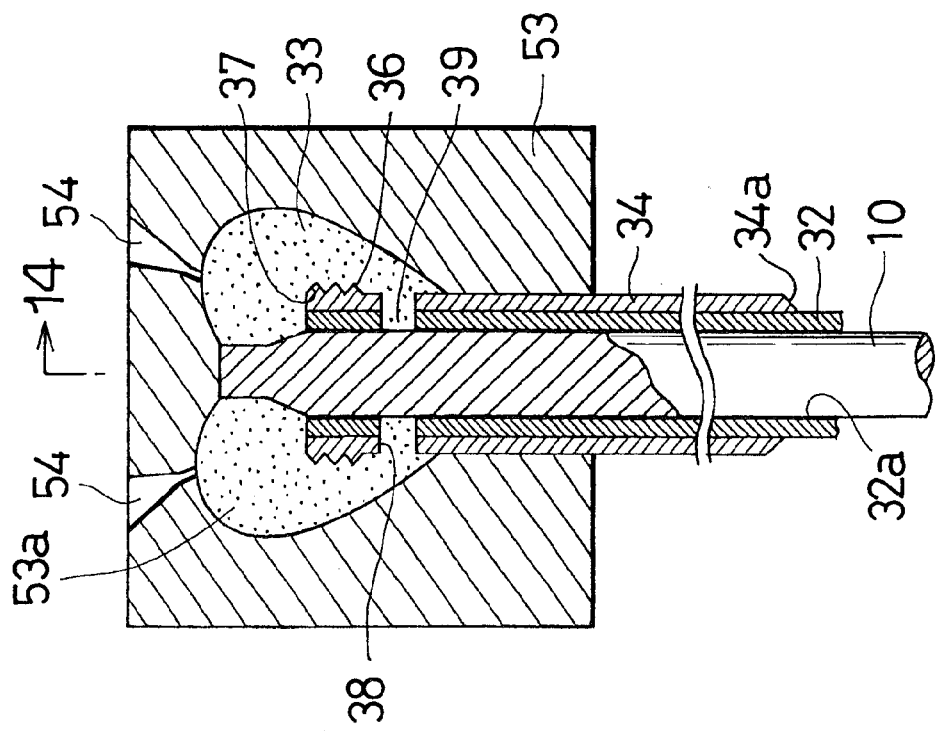
FIG. 14A is a cross-sectional view showing the forming die at the time of the insert forming of the mouthpiece of the aforementioned straw.
Figure 14B:
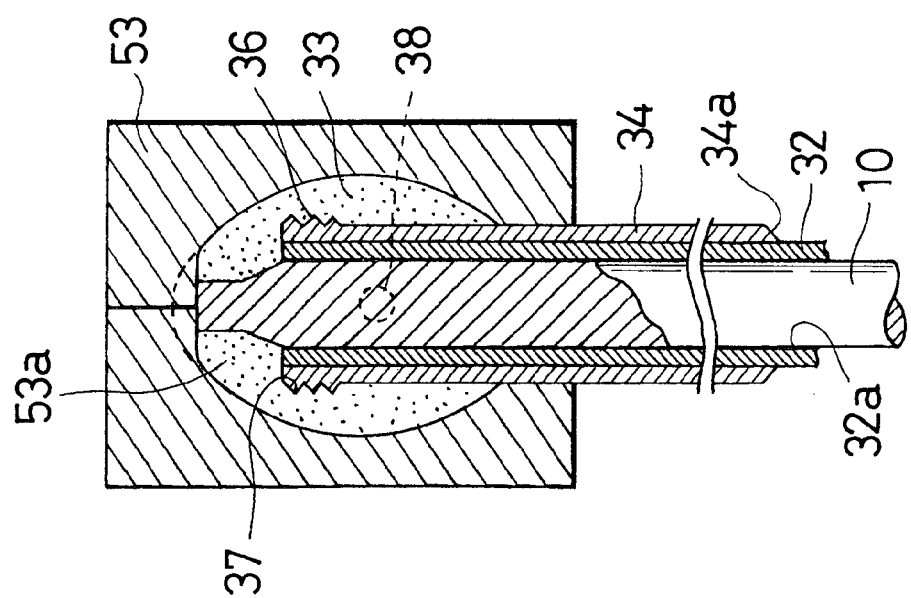
FIG. 14B is a cross-sectional view taken along the line 14—14 in FIG. 14A.
Figure 15A:
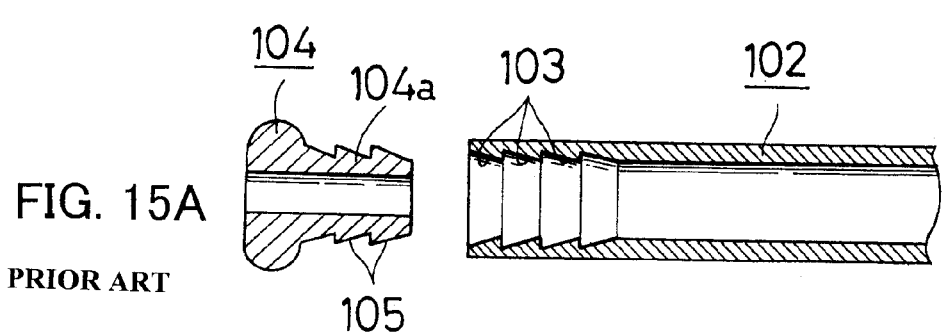
FIG. 15A is a cross-sectional view of a conventional straw with a mouthpiece showing the state where a mouthpiece is detached from a straw main body.
Figure 15B:
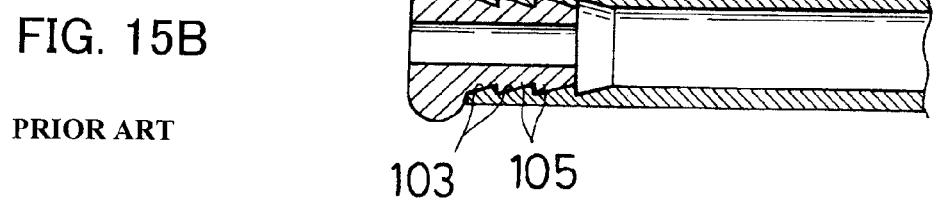
FIG. 15B is a cross-sectional view of the conventional straw with a mouthpiece showing the state where the mouthpiece is forcibly fitted into the straw main body.

Subsequently, a pair of opposing engaging apertures 38 and 38 are formed in the peripheral wall of the tip portion of the cylindrical reinforcing member 34 and that of the straw main body 32 so as to penetrate them. Thereafter, a mouthpiece with an enlarged head portion is integrally formed around the outer peripheral surface of the tip portion of the reinforcing member 34 and the outer peripheral surface of the protruded portion of the forming pin 10 by an insert forming method. FIGS. 14A and 14B show the arrangement of the straw main body 32 and the forming pin 10 in the forming die 53 at the time of insert forming. At this time, the tip end of the forming pin 10 protruding from the tip end of the straw main body 2 is arranged such that the tip end of the forming pin 10 butts against the upper central portion of the cavity 53a of the forming die 53. In this state, resin is injected into the cavity 53a through two pin gates 54 and 54 formed in the upper surface of the cavity 53. As a result, a mouthpiece 33 is integrally formed in a state that resin is introduced into the engaging apertures 38 penetrating the peripheral walls of the reinforcing member 34 and the straw main body 32 to form protrusions 39. In detail, the mouthpiece 33 is integrally formed on the reinforcing member 34 in a state that the engaging protrusions 39 inwardly protruded from the inner surface of the mouthpiece 33 is engaged with the engaging aperture 38.

Then, in the same manner as in the first embodiment, the forming pin 10 is pulled out from the forming die 23.

According to the aforementioned manufacturing method, since the manufacturing of the mouthpiece 33 and the cylindrical reinforcing member 34 and the integration of the straw main body 32, the cylindrical reinforcing member 34 and the mouthpiece 33 can be performed simultaneously, the manufacturing steps can be decreased, resulting in enhanced productivity. Furthermore, these members 32, 33 and 34 can be integrally connected each other easily.

As mentioned above, since the mouthpiece 3 is integrally connected with the tip portion of the straw main body 2, the straw will not be unintentionally detached from the user's mouth in cases where little children hold the straw in their mouth, resulting in an easy-to-use straw. Furthermore, since the engaging protrusion 7 of the mouthpiece 3 is engaged with the engaging aperture 6 penetrated in the peripheral wall constituting the straw main body 2, the mouthpiece 3 will not be unintentionally detached from the straw main body 2. Thus, there is no possibility that little children accidentally swallows the detached mouthpiece 3 when in use, resulting in a safety straw.

Moreover, since the mouthpiece 3 is integrally formed on the straw main body 3 by an insert molding method, the mechanical strength between the mouthpiece 3 and the straw main body 2 is excellent, which assuredly prevents the detachment of the mouthpiece 3 from the straw main body 2. In addition, the integration of the mouthpiece 3 to the straw main body 2 can provide a unique appearance, which can provide an excellent design in addition to the aforementioned function and safety features.

In cases where the mouthpiece 3 has a passage 3a having an internal diameter smaller than an internal diameter of the straw main body 2, it is possible to prevent little children from sucking up an excessive beverage in a single suck to be choked with the beverage. Thus, an easy-to-drink straw can be provided.

According to another straw with a mouthpiece according to the present invention, a cylindrical reinforcing member downwardly extending from the lower end of the mouthpiece is integrally formed so as to cover and reinforce the predetermined length of the tip portion of the straw main body. Therefore, it is hard to be deformed by a bite. Accordingly, even if little children bit a portion of the straw main body near the lower end of the mouthpiece, a detachment of the connected portion and/or a disengagement of the engaged structure due to a deformation of the cross-sectional shape of the straw main body can be prevented. Furthermore, if the mouthpiece should be detached from the straw main body, the mouthpiece will be detached together with the cylindrical reinforcing member. However, since the cylindrical reinforcing member is a relatively large piece covering the predetermined length of the tip portion of the straw main body, there is no danger that little children swallow it accidentally, resulting in a safety straw.

In cases where the cylindrical reinforcing member covers the outer peripheral surface of the tip portion of the straw main body and the mouthpiece is integrally formed on the outer surface of the tip portion of the reinforcing member in a closely fitted manner, material, color, etc. can be changed between the mouthpiece and the cylindrical reinforcing member. For example, applying different colors to both the members can provide a straw with unique design.

In cases where one or a plurality of engaging apertures are provided so as to penetrate the peripheral walls of the cylindrical reinforcing member and the straw main body and one or a plurality of engaging protrusions inwardly protruded from the inner surface of the mouthpiece are engaged with the engaging apertures, the mouthpiece, the cylindrical reinforcing member and the straw main body can be assuredly integrated with each other. Therefore, detachment of the members can be prevented more assuredly, which in turn can prevent the risk of accidental swallow of the members by little children.

In cases where the cylindrical reinforcing member is formed to have a lower end inwardly tapered as an insertion guide, the cylindrical reinforcing member can be easily inserted into a straw insertion aperture having a relatively small diameter, such as a straw insertion aperture formed in a cup with a cover. As a result, the straw forcibly inserted into the straw aperture is hard to be pulled out, resulting in an easy-to-drink straw.

According to the aforementioned method of manufacturing the straw, since the engaging aperture is provided to the peripheral wall of the tip portion of the straw main body, the mouthpiece can be integrally formed on the tip portion of the straw main body with the resin engaging protrusion engaged with the engaging aperture. Furthermore, the method includes the step of integrally forming the mouthpiece so as to surround the tip portion of the straw main body and the tip portion of the molding pin by an insert molding method and the step of removing the molding pin from the mouthpiece and the straw main body, a hollow space penetrating the mouthpiece in the axial direction of the straw can be formed, and the hollow space comes in fluid communication with the inner space of the straw main body to form a passage for sucking up a beverage. Moreover, according to the aforementioned method, the step for manufacturing the mouthpiece and the step for connecting the mouthpiece with the straw main body can be performed simultaneously at the time of the insert molding of the mouthpiece. This decreases the steps of manufacturing a straw with a mouthpiece and enhances the productivity.

In cases where the molding pin has the tip portion having an external diameter smaller than an external diameter of the remaining portion of the molding pin, it is possible to provide a mouthpiece which can prevent little children from sucking up excessive beverage in a single suck to be choked with the beverage. Thus, an easy-to-drink straw can be provided.

Furthermore, according to another manufacturing method according to the present invention, since engaging apertures are provided at the peripheral walls of the tip portion of the straw main body and the cylindrical reinforcing member, resin is introduced into these engaging apertures to form protrusions at the time of an insert molding, thereby integrating each other. As a result, in the same manner as in the aforementioned manufacturing method, strong integration of each member can be obtained. Thus, detachment of the members can be assuredly prevented.

This application claims priority to Japanese Patent Application No. 2000-91222 filed on Mar. 29, 2000, the disclosure of which is incorporated by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A straw with a mouthpiece, comprising:
   a straw main body having openings at both ends thereof; and
   a mouthpiece integrally connected with a tip portion of said straw main body,
   wherein said tip portion of said straw main body is provided with at least one engaging aperture penetrating a peripheral wall constituting said straw main body,
   wherein said mouthpiece is provided with at least one engaging protrusion inwardly protruded from an inner peripheral surface thereof,
   wherein said engaging protrusion is engaged with said engaging aperture, whereby said mouthpiece is integrally connected with said straw main body so as not to be detached therefrom, and
   wherein said mouthpiece and said straw main body are integrally molded together as a unitary piece.

2. The straw with a mouthpiece as recited in claim 1, wherein said mouthpiece is integrally formed on said tip portion of said straw main body by an insert molding method.

3. The straw with a mouthpiece as recited in claim 1, wherein said mouthpiece is connected with said tip portion of said straw main body so as to cover said tip portion from outside thereof.

4. The straw with a mouthpiece as recited in claim 1, wherein said mouthpiece has a passage having an internal diameter smaller than an internal diameter of said straw main body.

5. The straw with a mouthpiece as recited in claim 1, wherein said mouthpiece has a substantially unobstructed hollow space through which beverage can substantially freely pass.

6. The straw with a mouthpiece as recited in claim 1, wherein said straw main body and said mouthpiece are formed of synthetic resin, respectively.

7. The straw with a mouthpiece as recited in claim 6, wherein said straw main body is made of EVA(ethylene acetic acid vinyl copolymer resin), polypropylene or polyethylene, and wherein said mouthpiece is made of acetic acid vinyl resin, EVA(ethylene acetic acid vinyl copolymer resin), polypropylene or polyethylene.

8. The straw with a mouthpiece as recited in claim 5, wherein said hollow space has an external diameter that is smaller than an inner diameter of the straw main body to inhibit sucking up excess beverage.

9. A straw with a mouthpiece, comprising:
   a straw main body having openings at both ends thereof; and
   a mouthpiece integrally connected with a tip portion of said straw main body,
   wherein said tip portion of said straw main body is provided with at least one engaging aperture penetrating a peripheral wall constituting said straw main body,
   wherein said mouthpiece is provided with at least one engaging protrusion inwardly protruded from an inner peripheral surface thereof,
   wherein said engaging protrusion is engaged with said engaging aperture, whereby said mouthpiece is integrally connected with said straw main body so as not to be detached therefrom, and
   wherein said tip portion of said tip portion of said straw main body is provided with at least two engaging apertures each penetrating said peripheral wall, and wherein said mouthpiece is provided with at least two engaging protrusions each inwardly protruded from inner peripheral surface thereof.

10. A straw with a mouthpiece, comprising:
    a straw main body having openings at both ends thereof;
    a mouthpiece integrally connected with a tip portion of said straw main body; and
    a cylindrical reinforcing member downwardly extending from a lower end of said mouthpiece so as to cover and reinforce a predetermined length of said tip portion of said straw main body,
    wherein said cylindrical reinforcing member is integrally connected with said mouthpiece, and
    wherein said cylindrical reinforcing member is fixed to an outer peripheral surface of said tip portion of said straw main body so as to cover said outer peripheral surface from outside thereof, and wherein said mouthpiece is fixed to said tip portion of said straw main body such that said mouthpiece covers an outer peripheral surface of said tip portion of said cylindrical reinforcing member and said tip portion of said straw main body.

11. The straw with a mouthpiece as recited in claim 10, wherein said tip portion of said straw main body and a tip portion of said cylindrical reinforcing member are provided with at least one engaging aperture, respectively, each of said at least one engaging aperture penetrating a peripheral wall constituting said straw main body and a peripheral wall constituting said cylindrical reinforcing member, respectively,
    wherein said mouthpiece is provided with at least one engaging protrusion inwardly protruded from an inner peripheral surface thereof, and wherein said at least one engaging protrusion is engaged with each of said at least one engaging aperture, whereby said straw main body, said mouthpiece and said cylindrical reinforcing member are integrally connected with each other so as not to be detached from each other.

12. The straw with a mouthpiece as recited in claim 10, wherein said straw main body, said mouthpiece and said cylindrical reinforcing member are formed of synthetic resin, respectively.

13. The straw with a mouthpiece as recited in claim 10, wherein said mouthpiece is a piece integrally formed on said tip portion of said straw main body by an insert molding method.

14. The straw with a mouthpiece as recited in claim 10, wherein said mouthpiece is fixed to said tip portion of said cylindrical reinforcing member so as to cover said tip portion from outside thereof.

15. The straw with a mouthpiece as recited in claim 10, wherein said cylindrical reinforcing member is between about 25 mm to 60 mm long.

16. The straw with a mouthpiece as recited in claim 15, wherein said cylindrical reinforcing member is between about 35 mm to 50 mm long.

17. The straw with a mouthpiece as recited in claim 16, wherein said straw main body is made of EVA(ethylene acetic acid vinyl copolymer resin), polypropylene or polyethylene, wherein said mouthpiece is made of acetic acid vinyl resin, EVA(ethylene acetic acid vinyl copolymer resin), polypropylene or polyethylene, and wherein said cylindrical reinforcing member is made of acetic acid vinyl resin, EVA(ethylene acetic acid vinyl copolymer resin), polypropylene or polyethylene.

18. The straw with a mouthpiece as recited in claim 10, wherein said mouthpiece and said straw are of different colors to increase appeal to children.

19. A straw with a mouthpiece, comprising:

a straw main body having openings at both ends thereof; and a mouthpiece integrally connected with a tip portion of said straw main body, wherein said tip portion of said straw main body is provided with at least one engaging aperture penetrating a peripheral wall constituting said straw main body, wherein said mouthpiece is provided with at least one engaging protrusion inwardly protruded from an inner peripheral surface thereof, wherein said engaging protrusion is engaged with said engaging aperture, whereby said mouthpiece is integrally connected with said straw main body so as not to be detached therefrom, and wherein said mouthpiece includes an outside portion disposed on an outer peripheral surface of said straw main body and an inside portion disposed on an inner peripheral surface of said straw main body, and wherein said outside portion of said mouthpiece is integrally connected with said inside portion of said mouthpiece via said at least one engaging protrusion.

20. A straw with a mouthpiece, comprising:

a straw main body having openings at both ends thereof;

a mouthpiece integrally connected with a tip portion of said straw main body; and a cylindrical reinforcing member downwardly extending from a lower end of said mouthpiece so as to cover and reinforce a predetermined length of said tip portion of said straw main body, wherein said cylindrical reinforcing member is integrally connected with said mouthpiece, and wherein said cylindrical reinforcing member has an inwardly tapered lower end portion as an insertion guide.

21. A straw with a mouthpiece, comprising:

a straw main body having openings at both ends thereof; and a mouthpiece integrally connected with a tip portion of said straw main body, wherein said tip portion of said straw main body is provided with at least one engaging aperture penetrating a peripheral wall constituting said straw main body, wherein said mouthpiece is provided with at least one engaging protrusion inwardly protruded from an inner peripheral surface thereof, wherein said engaging protrusion is engaged with said engaging aperture, whereby said mouthpiece is integrally connected with said straw main body so as not to be detached therefrom, and wherein said mouthpiece is substantially wider than said straw main body and tapers in a direction towards an opposite end of said straw main body as seen from a front thereof.

22. The straw with a mouthpiece as recited in claim 21, wherein said mouthpiece has a substantially wider outermost diameter as seen from a front thereof than as seen from a single side thereof.

23. A straw with a mouthpiece, comprising:

a straw main body having openings at both ends thereof;

a mouthpiece integrally connected with a tip portion of said straw main body; and a cylindrical reinforcing member downwardly extending from a lower end of said mouthpiece so as to cover and reinforce a predetermined length of said tip portion of said straw main body, wherein said cylindrical reinforcing member is integrally connected with said mouthpiece, and wherein said mouthpiece has a passage having an internal diameter smaller than an internal diameter of said straw main body.

* * * * *